US012416450B2

(12) United States Patent
Hobbs et al.

(10) Patent No.: US 12,416,450 B2
(45) Date of Patent: Sep. 16, 2025

(54) HEAT EXCHANGE SYSTEM WITH TUBING APPLIED TO A COMPLEX CURVED SURFACE

(71) Applicant: Blue Origin Manufacturing, LLC, Huntsville, AL (US)

(72) Inventors: Gavin Bradley Hobbs, Maple Valley, WA (US); Patrick James Daniels, Poulsbo, WA (US); Kip Alan Carver, Mountlake Terrace, WA (US); Wooyong Jung, Mukilteo, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 213 days.

(21) Appl. No.: 18/069,080

(22) Filed: Dec. 20, 2022

(65) Prior Publication Data

US 2024/0200875 A1 Jun. 20, 2024

(51) Int. Cl.
*F28D 1/06* (2006.01)
*F17C 13/00* (2006.01)

(52) U.S. Cl.
CPC .............. *F28D 1/06* (2013.01); *F17C 13/001* (2013.01); *F17C 13/008* (2013.01); (Continued)

(58) Field of Classification Search
CPC .. F25D 23/061; F28D 1/06; F17C 2227/0376; F17C 2201/0128
See application file for complete search history.

(56) References Cited

U.S. PATENT DOCUMENTS 1,987,422 A * 1/1935 Steenstrup ............ F25D 23/061 29/890.038
2,576,985 A * 12/1951 Wildhack .................. F17C 9/02 137/338
(Continued)

FOREIGN PATENT DOCUMENTS

EP 1050487 B1 * 1/2002 ............... F28D 1/06
KR 102360225 B1 * 2/2022
WO WO-2013029298 A1 * 3/2013 ............... F24H 1/18

OTHER PUBLICATIONS

EP-1050487-B1 translation (Year: 2002).*
WO-2013029298-A1 translation (Year: 2013).*
KR102360225B1 translation (Year: 2022).*

*Primary Examiner* — Michael W Hotchkiss
(74) *Attorney, Agent, or Firm* — Summit Patents, PC

(57) ABSTRACT

A heat exchange system includes cooling tubes that carry coolant and are placed on an external surface of a storage tank, which may be spherical, cylindrical, or other shape. The storage tank may be a cryogenic rocket fuel tank. The cooling tubes are bent to particular radius of curvatures that correspond to the varying curvatures of the storage tank. A network of spacers and bridge brackets with adjustable setscrews are used to precisely place the cooling tubes in correct positions on the external surface of the storage tank. Once placed in the desired position, the setscrews are adjusted to maximize the surface area contact between the cooling tubes and the exterior surface of the storage tank, resulting in optimal heat transfer without overstressing the materials of the tubing or the storage tank. The precisely positioned tubes may then be permanently affixed to the exterior surface of the storage tank using a cryogenic adhesive.

20 Claims, 3 Drawing Sheets

(52) U.S. Cl.
CPC ................. *F17C 2201/0128* (2013.01); *F17C 2203/0362* (2013.01); *F17C 2221/011* (2013.01); *F17C 2221/012* (2013.01); *F17C 2260/031* (2013.01); *F17C 2270/0197* (2013.01); *F28F 2240/00* (2013.01); *F28F 2275/025* (2013.01); *F28F 2275/16* (2013.01)

(56) References Cited

U.S. PATENT DOCUMENTS

| | | | | | |
|---|---|---|---|---|---|
| 2,612,351 | A * | 9/1952 | Janos | F25D 23/061 165/56 |
| 2,716,866 | A * | 9/1955 | Silva | F24H 4/04 122/26 |
| 3,699,696 | A * | 10/1972 | Rhoton | F17C 7/00 62/45.1 |
| 4,140,073 | A * | 2/1979 | Androulakis | F17C 13/001 62/53.2 |
| 5,667,168 | A * | 9/1997 | Fluegel | B64D 13/00 165/169 |
| 8,960,482 | B2 * | 2/2015 | Brooks | F17C 1/12 220/560.15 |
| 10,386,123 | B2 * | 8/2019 | Garcia Martin | F28F 1/00 |
| 10,584,828 | B2 * | 3/2020 | Brooks | F17C 1/12 |
| 2004/0237557 | A1 * | 12/2004 | Harmon | F24S 10/755 62/238.6 |
| 2006/0011149 | A1 * | 1/2006 | Stevens | F24H 4/04 122/19.2 |
| 2009/0293448 | A1 | 12/2009 | Grote et al. | |
| 2010/0187237 | A1 * | 7/2010 | Brooks | F17C 1/12 220/660 |
| 2012/0060464 | A1 | 3/2012 | Grote et al. | |
| 2013/0199460 | A1 * | 8/2013 | Duplessis | F24H 9/02 29/890.07 |

* cited by examiner

HEAT EXCHANGE SYSTEM WITH TUBING APPLIED TO A COMPLEX CURVED SURFACE

STATEMENT OF FEDERAL FUNDING

NASA funds have been used for the project associated with this patent application.

BACKGROUND

In space, long duration missions generally require a capability to store and maintain propellant throughout the mission. Cryogenic propellants, such as liquid oxygen and liquid hydrogen, are difficult to maintain due to heating in space, which causes these propellants to boil off. A heat exchange system may be used to keep such propellants cool and in their liquid state. One type of heat exchange system may include a tank to contain the propellants, surrounded by tubing that carries a coolant, for example. Fabricating such a system presents a number of challenges, such as a difficulty of placing tubing on a curved tank so that full lengths of the tubing maintain thermal contact with the tank. This challenge is made more difficult when expensive, time-consuming, and complex fabrication steps are to be avoided.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
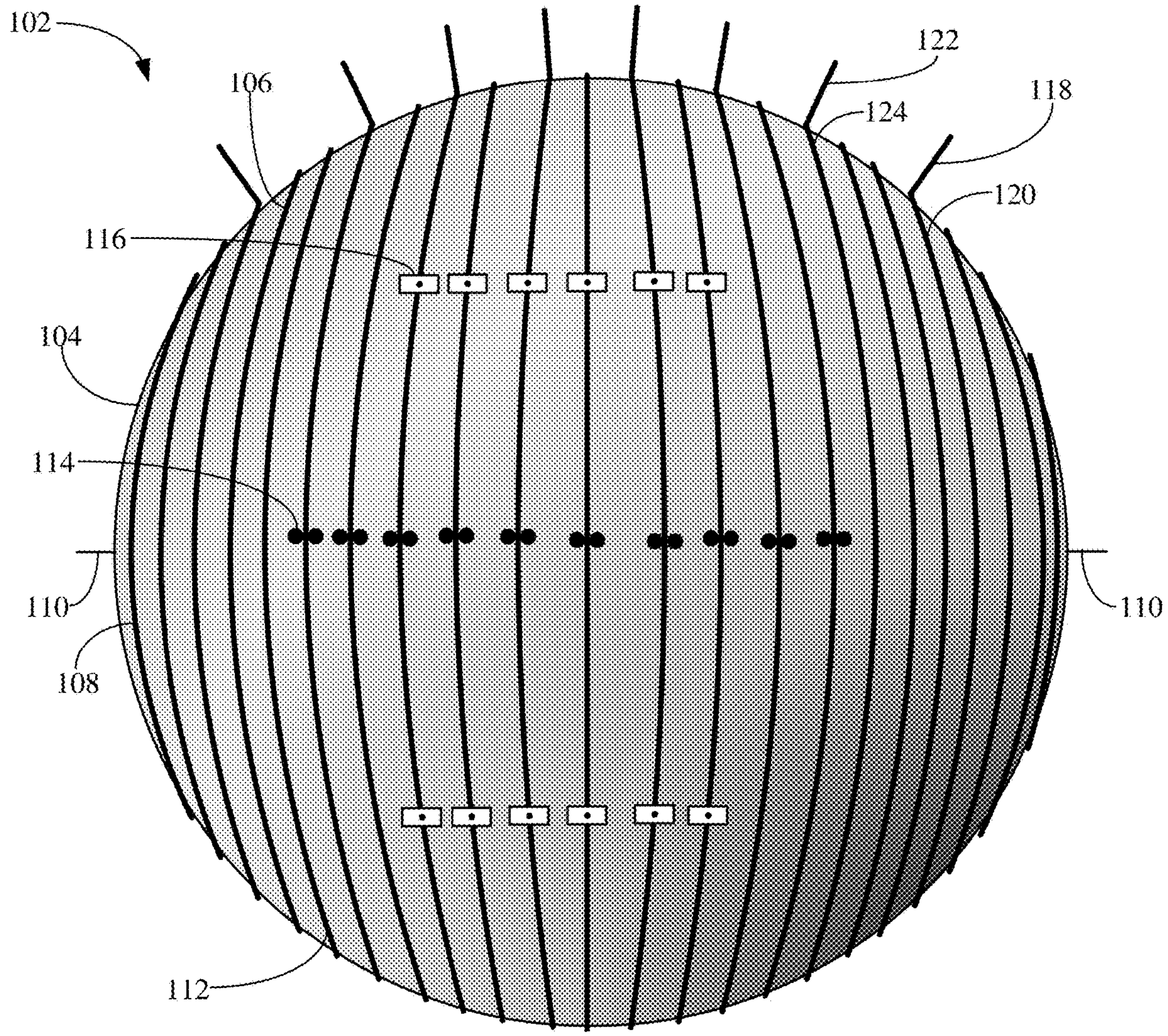
FIG. 1 is a front view of a heat exchange system comprising a tank and tubing overlaid thereon, according to some embodiments.

This disclosure describes architectures and methods for applying cooling tubes to an external surface of a tank, such as a cryogenic rocket fuel tank. More generally, such methods may be extended to a process for applying complex structures to curved surfaces, as described below.

The architectures and methods involve a network of spacers and bridge brackets with adjustable setscrews to precisely place cooling tubes in correct positions on the external surface of a tank. Once placed in the desired position, the setscrews are adjusted to maximize the surface area contact between the cooling tubes and the exterior surface of the tank, resulting in optimal heat transfer without overstressing the materials of the tubing or the tank. The precisely positioned tubes may then be permanently affixed to the exterior surface of the tank using a cryogenic adhesive, for example.

In a particular implementation, a series of relatively long tubes (sections of tubing) are to be placed onto and around a large spherical fuel tank to create a heat exchange system. One method for performing this task has involved sections of hand-bent tubing taped to the tank. This method, however, produced poor results, wherein the tubing failed to be in contact with the surface of the tank along most of the length of the tubing. Such lack of surface contact results in relatively poor performance of the system's ability to exchange heat. Instead of tape, the tubing could be placed secured onto the tank by soldering, welding, brazing, adhesives, or other types of bonding or mechanical connectors. These methods, however, are expensive, can disrupt the integrity of the tank, and/or still fail to sufficiently place the tubing into contact with the tank.

Embodiments described herein avoid the problems of the particular techniques described above. Embodiments, described in detail below, involve using a system of bending tools that mechanically bend tubing into relatively long 3-dimensional coils (e.g., spirals). Consequently, the tubing may be curved to match the curvature of the tank. Because the curvature of the tank may vary over its surface, the curvature of the tubing may be customized by the bending process to match the various curvatures of the tank. A series of spacers are placed and adhered (e.g., hot-glued) at locations on the tank. Such locations may be determined by any of a number of measuring methods, such as by projecting a patterned image onto the surface, analog measurements using an indexed cord, and laser beam alignment, just to name a few examples. In the former example, an image of a patterned grid based on a spherical coordinate system, for instance, may be projected onto the tank surface. The image may include features that indicate where to place spacers. The spacers help guide and at least partially hold the tubing around the tank in the desired places. U-shaped bridge brackets are adhered (e.g., hot-glued) to the tank to hold the tubes down against the tank. Relatively soft setscrews (e.g., nylon, Teflon, plastic, etc.) that are included with each of the brackets may then be adjusted to place and adjust a force onto the tubing so that the tubing is pushed against the tank surface. In this way, surface contact between the tank and the tubing may be secured. Cryogenic adhesive may be applied later to the tube and tank to permanently hold the tubing in place, and the bridge brackets and spacers may subsequently be removed after the cryogenic adhesive is applied and cured. Such a cryogenic adhesive may be an epoxy or epoxy composite material, for example, having relatively high thermal conductivity and that can withstand rapid drops in temperature.

FIG. 1 is a front view of a heat exchange system 102 comprising a tank 104 and tubing 106 overlaid on the tank, according to some embodiments. Tubing 106 is thermally coupled with tank 104, which may be a cryogenic tank for holding rocket fuel (e.g., liquid oxygen or liquid hydrogen), for example. Tubing 106 may carry a coolant, such as cold helium, to cool the tubing and in turn cool the surface of the tank. Described in a different perspective, the coolant absorbs and carries away heat, via the tubing, from the contents of the tank. Accordingly, the quality of thermal contact, which is addressed by embodiments herein, between the tubing and the tank is important.

Tank 104 is spherical in this example embodiment, but may be any shape, such as cylindrical or oval, just to name a few examples, having a curved surface. System 102 includes tubing 106 that may comprise sections of tubing having various lengths. Different sections of tubing may be curved differently from one another to conform to different parts of the curved surface of the tank. For example, the radius of curvature of a section of tubing 108 to be placed latitudinally (spherical latitude) near the poles 110 of a sphere (e.g., tank 104) will be smaller (e.g., a "sharper" curve) than a section of tubing 112 placed further away from the poles. Also, perimeters at spherical latitudes closer to poles 110 are smaller than those further from the poles. Accordingly, a section of tubing placed on tank 104 nearer to the poles can "loop" around the tank more times than the same section of tubing if placed further from the poles. Interestingly, although the entire surface of a sphere is generally uniform and homogeneous, the surface presents the above-described complexities when tubing is applied to the surface on different parts of the sphere. Thus, the amount of curvature of the tubing is varied and adjusted during a tube-bending process, described below, to account for the curvature of the tank at the spherical latitude where the tubing is to be placed.

Thus, in an embodiment, wherein the curvature of the surface of the tank varies over its surface, a first portion of a particular section of the tubing may be curved with a first curvature (e.g., radius of curvature) that conforms to a first curvature of a first surface of the tank, and a second portion of the particular section of the tubing may be curved with a second curvature that conforms to a second curvature of a second surface of the tank. This particular section of tubing may be a single contiguous length of tubing that comprises both the first portion and the second portion.

Generally, even though the tube-bending process curves the tubing to account for the curvature of the sphere, the curvatures of the tubing and sphere likely will not exactly equal each other for at least two reasons. First, the tube-bending process may not be precise enough to produce curved tubing having the exact prescribed radius of curvature. This may be because of tolerances of the mechanical tube bending apparatus and/or because of the resilience of the tubing, which may lead to changing curvature as the metal of the tubing relaxes after bending forces are removed. Second, because a section of tubing (e.g., 112) is spirally wrapped around tank 104, the curvature changes continuously along the length of the tubing. In other words, there is no single correct value for the radius of curvature for the section of tubing. As described below, a section of tubing may be bent into a spiral, having uniformly changing curvature to match the surface of the tank.

Because of the issues described above, one cannot always expect a section of tubing to simply and conveniently rest commensurably on the surface of tank 104. Accordingly, system 102 includes spacers 114 and bridge brackets 116 attached to the surface of tank 104. Each of the spacers has a slot portion that accommodates a portion of the tubing to at least partially secure the tubing in a particular location on the surface of the tank. Spacers 114 may comprise any material and shape that is able to laterally (e.g., tangential to the tank surface) apply a reaction force to the tubing. In this way, a spacer is able to prevent the tubing from sliding sideways on the surface of the tank. Each bridge bracket is U-shaped to accommodate a portion of the tubing and includes a setscrew to at least partially secure the tubing in a particular location on the surface of the tank, as described below. Only a portion of spacers 114 and bridge brackets 116 are illustrated in FIG. 1 and the spacers and bridge brackets that are illustrated are not necessarily in any particular locations. Generally, spacers 114 and bridge brackets 116, which may be attached to tank 104 by an adhesive, may be located at several locations along a section of tubing and on any location on tank 104.

In an implementation, individual sections of tubing may be terminated with a substantially orthogonal bend away from the tank. For example, an end portion 118 of tubing section 120 is bent away from tank 104. Only some of the end portions of tubing sections are illustrated in FIG. 1 and the end portions that are illustrated are not necessarily in any particular locations. For example, tubing section 120 may be terminated at its other end at an end portion that is behind tank 104 and not visible in FIG. 1. End portions of tubing sections may be interconnected to one another at a latter part of the fabrication of system 102. For example, end portion 118 of tubing section 120 may be connected (not illustrated) to end portion 122 of another tubing section 124. At least one end portion of one of the tubing sections may be connected to a source of coolant and at least one end portion of another one of the tubing sections may be connected to an output port for the coolant. In some implementations, the coolant may be circulated or recirculated through all the interconnected tubing sections by a circulating pump, for example.

Figure 2:
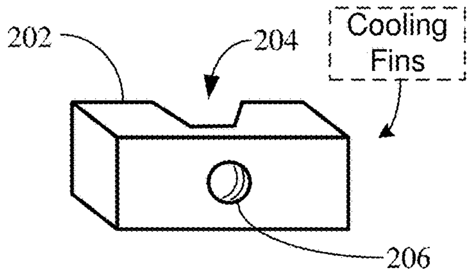
FIG. 2 is a perspective view of a bridge bracket, according to some embodiments.
Figure 3:
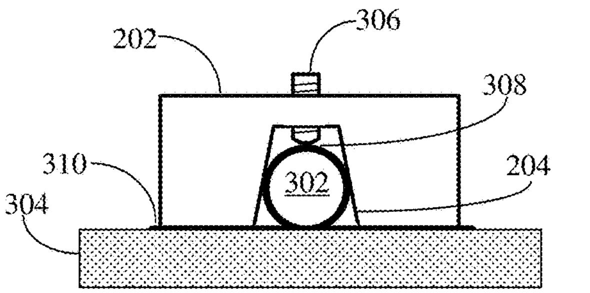
FIG. 3 is a cross-section view of a bridge bracket with a portion of tubing in contact with a portion of a surface of a tank, according to some embodiments.

FIG. 2 is a perspective view of a bridge bracket 202 and FIG. 3 is a cross-section view of the bridge bracket with a portion of tubing 302 in contact with a portion 304 of a surface of a tank, according to some embodiments. Bridge bracket 202 may be the same as or similar to bridge brackets 116 that are attached to the surface of tank 104. Bridge bracket 202 is generally U-shaped, having a recessed region 204 to accommodate a portion of the tubing. Bridge bracket 202 may include a setscrew 306 inserted into a threaded hole 206. If setscrew 306 is turned so as to travel downward in FIG. 3, a tip 308 of the setscrew will eventually contact tubing 302. Beyond this point, continued turning of the setscrew will push the tubing into contact with the surface of the tank. In this fashion, tubing 302 may be secured to the surface of the tank and in thermal contact. Bridge brackets 202 may be attached to tank 104 by an adhesive 310 and, as mentioned above, may be located at several locations along a section of tubing and on any location on tank 104. In some implementations, adhesive 310 may be a hot-melt glue applied with a glue gun. Toward a latter part of fabricating system 102, a permanent cryogenic adhesive may be used to replace or to add to adhesive 310 for attaching the bridge brackets to the tank). For example, the permanent cryogenic adhesive may be applied along substantial lengths of the tubing and in contact with the surface of the tank.

In some implementations, bridge brackets 202 may be made of metal, such as a relatively light metal having good heat conductivity. Bridge brackets 202 may include cooling fins, or some physical feature to increase their surface area, to radiate heat. In other implementations, bridge brackets 202 may include a bolt, threaded hole, or other type of connection apparatus, or portion thereof, so that relatively large radiating surfaces can be attached to the bridge brackets. For example, a metal panel or appended cooling fin may be attached to bridge bracket 202. In this way, heat exchange system 102 may remove heat from tank 104 through the bridge brackets, in addition to removing heat via coolant flowing in the tubing.

In some implementations, setscrew 306 may be a plastic or plastic-tipped screw (e.g., nylon, Teflon, etc.). The relative softness of this type of screw is desirable so as to avoid the possibility of damaging tubing 302 if setscrew 306 is turned too much, imparting excessive force on the tubing. For example, the tubing may be relatively soft aluminum, though stainless steel or other metal tubing may also be used. In some implementations, the relative hardness of tubing 302 drives the selection of the material for setscrew 306 such that the material comprising setscrew 306 is always of higher relative softness to the material comprising tubing 302. In some implementations, bridge bracket 202 may be made of aluminum or other metal, or made of plastic, such as a 3D printed part. Plastic over metal may be preferred because it is relatively light and sufficiently strong for use as a bridge bracket. Metal, however, may provide a thermal advantage over plastic if system 102 is to be designed to allow the bridge brackets to act as heatsinks, as mentioned above, for example. In this case, the bridge brackets may include physical features, such as fins, to increase their surface area for radiating heat. Also, a thermal compound (e.g., a gel or hardening paste) may be placed in a region between the bridge bracket and the tubing.

Figure 4:
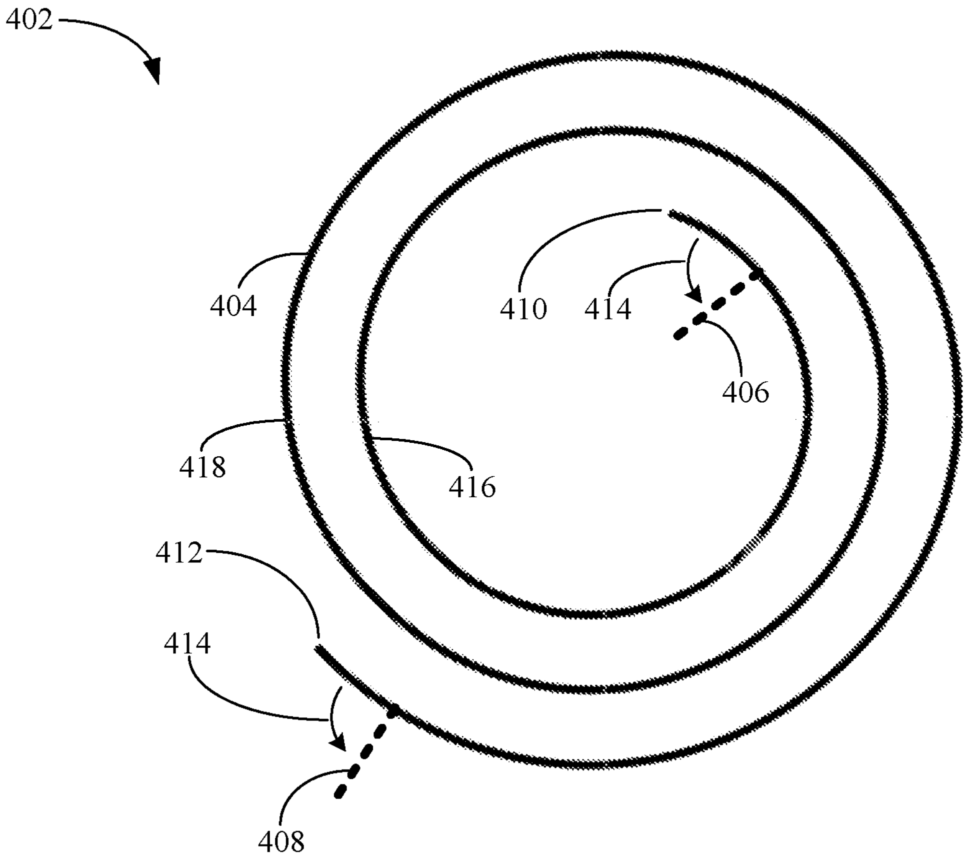
FIG. 4 illustrates a section of tubing having a curvature that varies along its length so as to conform to the varying curvature of the surface of a tank, according to some embodiments.

FIG. 4 illustrates a section 402 of tubing having a curvature that varies along its length so as to conform to the varying curvature of the surface of a tank, according to some embodiments. For example, tubing section 402 may be the same as or similar to any of tubing sections 108, 112, 120, and 124, described above. Tubing section 402 may include curved tubing 404, first end portion 406, and second end portion 408. First and second end portions are illustrated as dashed lines to indicate that tubing 404 initially has a spiral shape, with endpoints 410 and 412. Afterward, portions of tubing 404 that include the endpoints are bent orthogonally, indicated by arrows 414, so as to be directed outward from the tank. Such bending may be carefully performed so as to prevent crimping of the tubes. This bending creates first and second end portions, which may be the same as or similar to 118 or 122, for example.

Not including first and second end portion 406 and 408, tubing section 402 has a substantially uniform, continuous rate of change of curvature along its length. For example, portion 416 of tubing section 402 has a smaller radius of curvature than portion 418. Generally, bending tubing so as to have a continuous rate of change of curvature along its length may be difficult. A section of tubing that does not have an ideal curvature at all portions of its length likely will not conform perfectly to the surface of a spherical tank, such as 104. Thus, as explained above, spacers 114 and bridge brackets 116 may be used to assist in placing and securing the section of tubing to the tank.

Figure 5:
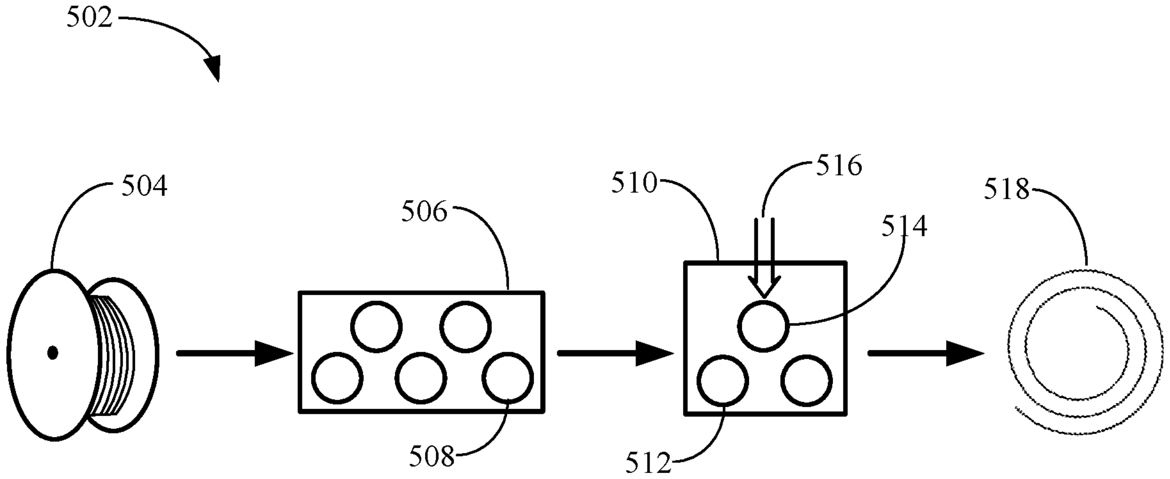
FIG. 5 schematically illustrates a process of bending a section of tubing so as to conform to the varying curvature of the surface of a tank, according to some embodiments.

FIG. 5 schematically illustrates a process 502 for bending a section of tubing, such as 402, so as to conform to the varying curvature of the surface of a tank, according to some embodiments. The section of tubing may be a cut portion of tubing initially rolled onto a large spool 504. Tubing extracted from the spool tends to have a curvature from being stored on the spool. A tube straightener 506 may be used to remove this curvature by using a series of rollers 508. Next, the straightened (though not necessarily perfectly straightened since residual curvature will likely remain) tubing may be fed into a tubing bender 510 that uses a series of rollers 512 to impart a curvature to the tubing. The amount of curvature may be set and adjusted by controlling an up and down position of roller 514 to vary the amount of bending force 516. Uniformly adjusting bending force 516 continuously over time may lead to a continuously changing curvature, resulting in a spiral-shaped tubing section 518.

Figure 6:
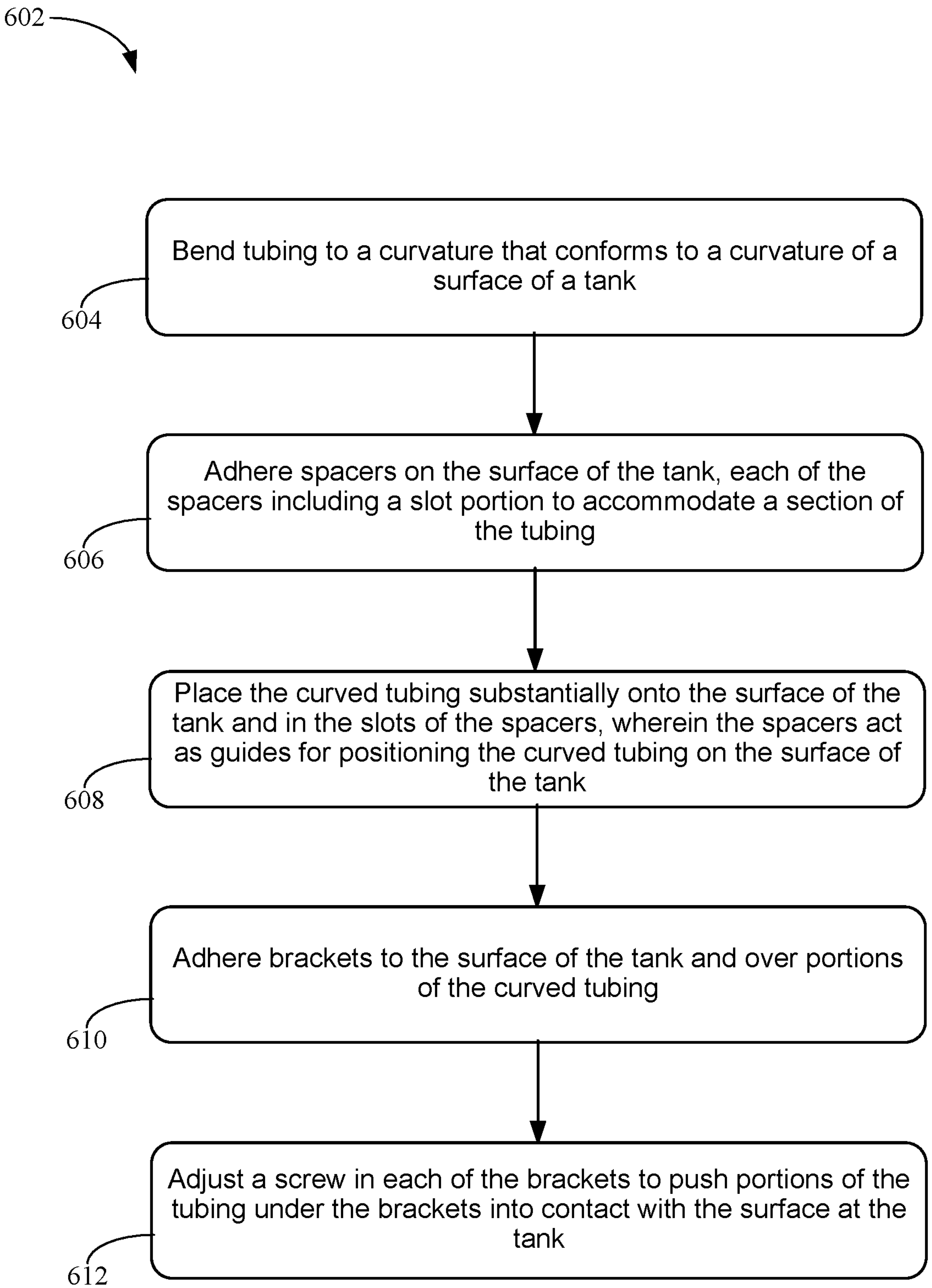
FIG. 6 is a flow diagram of a process of fabricating a heat exchange system comprising a tank and tubing, according to some embodiments.

FIG. 6 is a flow diagram of a process 602 of fabricating a heat exchange system, such as system 102, comprising a tank and tubing, according to some embodiments. The process may be performed by a fabricator that begins process 602 with coiled tubing originating from a large spool (e.g., 504). At block 604, the fabricator may bend the tubing to a curvature that conforms to a curvature of a surface of a tank, such as tank 104, for example. The tubing may be cut to a desired length to result in a curved section of tubing. Such a desired length may be determined by considering how many "loops", or portions thereof, the section of tubing is to wrap around the tank. Increasing the length of sections provides an advantage of reducing the number of tubing interconnections needed after completing process 602. A tradeoff, however, is that longer lengths of tubing are generally more difficult to manage (e.g., maintaining desired curvature, transporting from the tube bender to the tank, and applying the tubing to the tank).

At block 606, the fabricator may adhere spacers, such as 114, on the surface of the tank, each of the spacers including a slot portion (e.g., a region between the two principal portions of the spacer) to accommodate a section of the tubing. At block 608, the fabricator may place the curved tubing substantially onto the surface of the tank and in the slots of the spacers, wherein the spacers act as guides for positioning the curved tubing on the surface of the tank. At block 610, the fabricator may adhere bridge brackets, such as 116 or 202, to the surface of the tank and over portions of the curved tubing. At block 612, the fabricator may adjust a setscrew, such as 306, in each of the bridge brackets to push portions of the tubing under the bridge brackets into contact with the surface at the tank.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

We claim as follows:

1. A method of fabricating a heat exchange system upon a surface of a storage tank, the method comprising:
- bending at least a section of tubing to a curvature that conforms to a curvature of the surface of the storage tank;
- adhering spacers to the surface of the storage tank, where the spacers include a slot portion to accommodate a section of the tubing;
- placing the curved tubing substantially onto the surface of the storage tank and in the slot portions of the spacers, wherein the spacers act as guides for positioning the curved tubing on the surface of the storage tank;
- adhering bridge brackets to the surface of the storage tank and over portions of the curved tubing; and
- adjusting a setscrew in each of the bridge brackets to push portions of the tubing under the bridge brackets into contact with the surface of the storage tank.

2. The method of claim 1, wherein the curvature of the surface of the storage tank varies over the surface, and wherein bending the tubing to the curvature that conforms to the curvature of the surface of the storage tank further comprises:

bending a first portion of the tubing to a first curvature that conforms to a first curvature of a first surface of the storage tank; and bending a second portion of the tubing to a second curvature that conforms to a second curvature of a second surface of the storage tank, wherein a single contiguous length of the tubing comprises the first portion and the second portion.

3. The method of claim 1, wherein the spacers are adhered to the surface of the storage tank using an adhesive.

4. The method of claim 1, wherein the spacers and the bridge brackets are adhered to the surface of the storage tank using a hot-melt glue gun, the method further comprising:

determining that the tubing is in contact with, and secured to, the surface of the storage tank with an adhesive; and applying a permanent cryogenic adhesive to the tubing and the surface of the storage tank.

5. The method of claim 1, wherein the tubing is selected from the group consisting of: (i) aluminum tubing, or (ii) stainless steel tubing.

6. The method of claim 1, wherein the setscrew is at least partially plastic.

7. The method of claim 1, wherein the storage tank is a cryogenic storage tank for storing cryogenic fluids.

8. The method of claim 1, wherein the storage tank is substantially spherical.

9. The method of claim 1, further comprising determining where to place at least some of the spacers or bridge brackets on the surface of the storage tank by projecting a patterned image onto the surface.

10. The method of claim 1, wherein the bridge brackets are metal, the method further comprising inserting a thermal compound into a region between each of the bridge brackets and the tubing.

11. The method of claim 10, wherein the bridge brackets include cooling fins to radiate heat.

12. A method of arranging thermal contact between a heat exchange system and a surface of a storage tank, the method comprising:

bending at least a section of tubing of the heat exchange system to a curvature that at least partially conforms to a curvature of the surface of the storage tank to produce curved tubing;

placing the curved tubing onto the surface of the storage tank and in slot portions of spacers that are on the surface of the storage tank, wherein the spacers act as guides for positioning the curved tubing on the surface of the storage tank;

after placing the curved tubing onto the surface of the storage tank, adhering bridge brackets to the surface of the storage tank and over portions of the curved tubing; and adjusting a setscrew in each of the bridge brackets to push portions of the tubing under the bridge brackets into thermal contact with the surface of the storage tank.

13. The method of claim 12, wherein the curvature of the surface of the storage tank varies over the surface, and wherein bending the tubing to the curvature that conforms to the curvature of the surface of the storage tank further comprises:

bending a first portion of the tubing to a first curvature that conforms to a first curvature of a first surface of the storage tank; and bending a second portion of the tubing to a second curvature that conforms to a second curvature of a second surface of the storage tank, wherein a single contiguous length of the tubing includes the first portion and the second portion.

14. The method of claim 12, wherein the bridge brackets are adhered to the surface of the storage tank using a hot-melt glue gun, the method further comprising:

determining that the tubing is in thermal contact with, and secured to, the surface of the storage tank with an adhesive; and applying a permanent cryogenic adhesive to the tubing and the surface of the storage tank.

15. The method of claim 12, wherein the thermal contact between the tubing under the bridge brackets and the surface of the storage tank comprises a physical contact between the tubing and the surface of the storage tank.

16. The method of claim 12, wherein the storage tank is a cryogenic storage tank for storing cryogenic fluids.

17. The method of claim 12, wherein the storage tank is substantially spherical.

18. The method of claim 12, further comprising determining where to place at least some of the spacers or bridge brackets on the surface of the storage tank by projecting a patterned image onto the surface.

19. The method of claim 12, further comprising placing a thermal gel or hardening paste in a region between the bridge brackets and the curved tubing.

20. The method of claim 19, wherein the bridge brackets are metal and include cooling fins to radiate heat.

* * * * *